United States Patent [19]

Sieber et al.

[11] 3,964,191

[45] June 22, 1976

[54] APPARATUS FOR SIMULTANEOUS VIEWING OF BOTH SIDES OF WEBS OF PHOTOGRAPHIC PAPER OR THE LIKE

[75] Inventors: Werner Sieber, Munich; Friedrich Ganser, Feldkirchen; Thomas Hammer; Wolfgang Viehrig, both of Munich; Hans-Dieter Frick; Viktor Osegowitsch, both of Taufkirchen, all of Germany

[73] Assignee: AGFA-Gevaert, A.G., Leverkusen, Germany

[22] Filed: Sept. 24, 1975

[21] Appl. No.: 616,412

[30] Foreign Application Priority Data

Sept. 26, 1974 Germany............................ 2445996

[52] U.S. Cl................................... 40/86 A; 40/31;
350/299; 352/129
[51] Int. Cl.²........................................ G09F 11/29
[58] Field of Search................ 40/86 A, 31, 106.1,
40/86 R, 347, 32, 46, 38, 42, 88, 93, 96;
350/123, 299; 352/129, 90; 353/44

[56] References Cited
UNITED STATES PATENTS

| 2,002,867 | 5/1935 | Powers................ | 40/86 A X |
| 2,539,676 | 1/1951 | Sontag et al.......... | 40/86 A X |
| 2,635,371 | 4/1953 | Mazzoco................ | 40/86 A X |
| 3,522,982 | 8/1970 | Hughes.................. | 350/123 X |

FOREIGN PATENTS OR APPLICATIONS 372,194   5/1932   United Kingdom................ 40/31

*Primary Examiner*—John F. Pitrelli
*Attorney, Agent, or Firm*—Michael J. Striker

[57] ABSTRACT

Apparatus for simultaneous viewing of front and rear surfaces of webs of exposed and developed photographic paper has a frame which supports a rearwardly and upwardly inclined transparent pane constituting the front panel of a box. The frame has a rear wall which is normal to the pane and carries two spindles extending in parallelism with the plane of the pane and serving to support supply and takeup reels for a web of photographic paper whereby the rear side of the web portion between the reels lies against the front side of the pane and the front side of such web portion is observable from the front side of the frame. The box and/or the frame contains a drive which can rotate the one or the other spindle in a direction to cause the respective reel to collect the web while braking the other spindle, and the box contains a pair of mirrors which reflect the image of the rear side of the web portion through the pane so that such image can be seen by a person sitting or standing in front of the frame and viewing the front side of the web portion. At least the spindle for the supply reel is close to the floor so that the supply reel, which normally carries a large roll of convoluted photographic paper, need not be lifted well above the floor in order to be placed onto the respective spindle.

17 Claims, 4 Drawing Figures

U.S. Patent   June 22, 1976   3,964,191
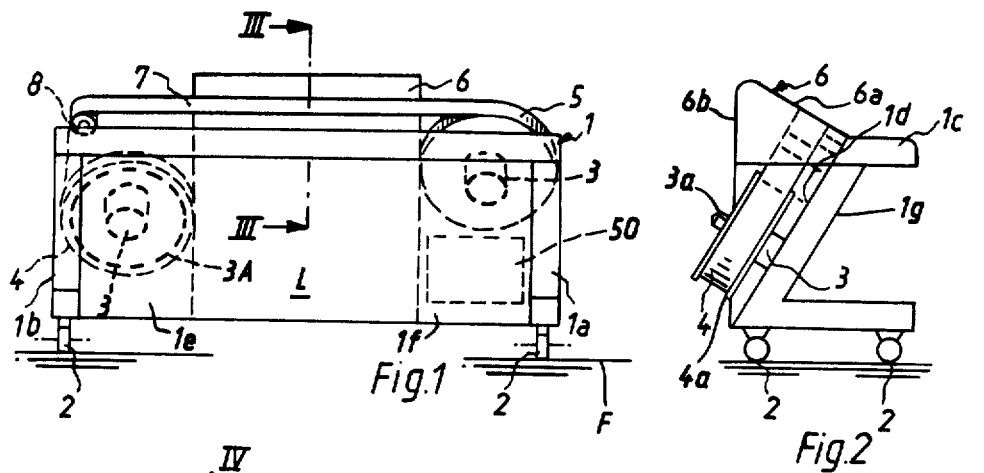
Fig.1
Fig.2
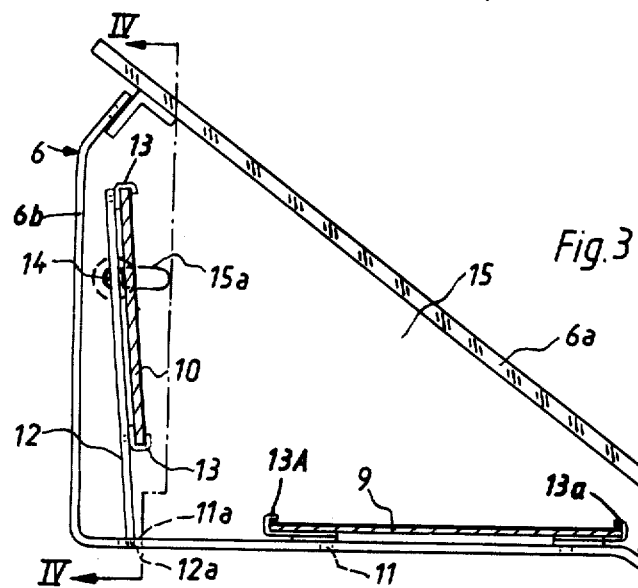
Fig.3
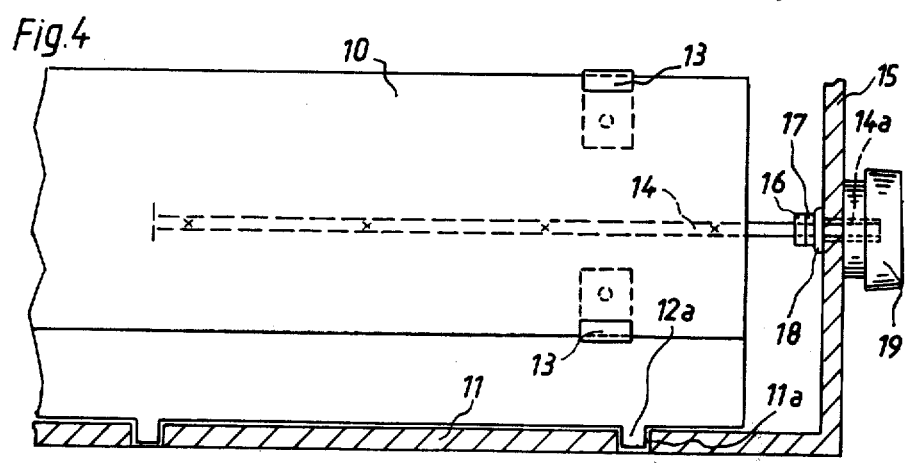
Fig.4
WERNER SIEBER
FRIEDRICH GANSER
THOMAS HAMMER
WOLFGANG VIEHRIG
HANS-DIETER FRICK
VIKTOR OSEGOWITSCH

APPARATUS FOR SIMULTANEOUS VIEWING OF BOTH SIDES OF WEBS OF PHOTOGRAPHIC PAPER OR THE LIKE

BACKGROUND OF THE INVENTION

The present invention relates to apparatus for viewing or observation of webs of photographic paper or the like. More particularly, the invention relates to improvements in apparatus which serve to permit simultaneous viewing of the front and rear sides or surfaces of successive portions of a web of exposed and developed photographic paper so that the attendant or attendants can readily recognize unsatisfactory prints at the front side of the web while simultaneously observing marks, exposure factors and/or other information which is applied to the rear side of the web.

Certain presently known apparatus for viewing of webs of exposed and developed photographic paper comprise means for guiding the web, which is being withdrawn from a supply reel and is collected by a takeup reel, in such a way that the web is located in a plane making an acute angle with a horizontal plane so that an attendant standing or sitting in front of the apparatus can look downwardly onto successive prints. As a rule, presently known apparatus of the just outlined character are designed to accept and support supply reels for relatively short webs of photographic paper, normally in the range of up to 100 meters. The just described apparatus are not suited for use in modern film processing plants wherein photographic films are exposed, developed and copied in a fully automatic way. Such plants can operate economically only if the webs of photographic paper are collected on reels each of which carries a very large roll of convoluted paper, e.g., a roll containing up to and in excess of 300 meters of paper. Depending on the width of photographic paper, a reel which carries up to and in excess of 300 meters of convoluted web material is extremely bulky and heavy so that its manipulation is cumbersome and necessitates the exertion of a substantial effort. Moreover, many presently known apparatus do not allow for observation of discrete prints for relatively long intervals of time; such long intervals are especially desirable when the attendant must view the prints at the front side of the web simultaneously with indicia which are applied to the rear side of the web and represent, among others, data pertaining to exposure factors during imaging of originals onto the web in a photographic copying machine.

SUMMARY OF THE INVENTION

An object of the invention is to provide a novel and improved apparatus which can be used for simultaneous viewing of front and rear sides of relatively short or relatively long webs of photographic paper or the like, wherein a relatively large roll of convoluted photographic paper or other web material can be properly installed and/or removed by exertion of a relatively small effort, which allows for long-lasting observation of discrete or successive portions of a moving web, which is compact and can be readily transported between different locales or use and/or from or into storage, and which can be used for viewing of relatively wide, relatively narrow or medium-width webs.

Another object of the invention is to provide the apparatus with novel and improved means for permitting observation of rear sides of successive prints on a web of photographic paper or the like.

A further object of the invention is to provide a novel and improved frame for use in an apparatus of the above outlined character.

An additional object of the invention is to provide the apparatus with novel and improved means for permitting long-lasting observation of successive or selected portions of a moving web of photographic paper or the like without contributing to the bulk and/or cost of the apparatus.

The invention is embodied in an apparatus for observation or viewing of front and rear surfaces of a web of photographic paper or the like while the web is being withdrawn from a supply reel and is collected by a takeup reel. The apparatus can be said to constitute a table having a frame which includes front and rear sides, a light-transmitting pane mounted on the frame and being inclined with respect to a horizontal plane so that one surface of the pane slopes upwardly and rearwardly from the front side of the frame, a wall forming part of the frame and located at the rear side of the frame so as to make with the pane an angle of approximately 90 degrees, spaced apart first and second spindles or analogous mounting means provided on the aforementioned wall for respectively supporting a supply reel and a takeup reel so that the axes of the reels are parallel to the pane and the rear surface of the web portion between the reels on the two mounting means lies against the one surface of the pane whereby the front surface of such web portion is observable from the front side of the frame, and mirrors mounted on the frame (preferably in a hollow box-shaped receptacle which includes the pane) behind the pane for imaging the rear surface of the web portion so that the image of the rear surface is observable through the pane from the front side of the frame.

The frame may be provided with wheels or analogous floor-contacting portions, and at least that portion of the aforementioned wall which carries the mounting means for the supply reel is located at a level below the pane so that a supply reel on the first mounting means is close to the floor. The receptacle and/or the frame may further serve as a means for supporting and confining the drive means which rotates one of the mounting means at a time in a direction to cause the respective reel to collect the web. The receptacle is preferably located between the two mounting means and the mirrors preferably include a first mirror and a second mirror, both mounted in the receptacle. The reflecting surface of the first mirror illuminates the rear surface of the web portion overlying the pane and the reflecting surface of the second mirror reflects the image of the rear surface of the second mirror reflects the image of the rear surface through that portion or part of the pane which is adjacent to the pane portion behind the web. At least one of the mirrors is preferably adjustable to thus enable a person sitting in front of the frame to select the level at which the image of the rear side of the web is observable by looking at the one surface of the pane.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic front elevational view of an apparatus which embodies the invention;

FIG. 2 is a schematic end elevational view as seen from the left-hand side of FIG. 1;

FIG. 3 is an enlarged fragmentary sectional view as seen in the direction of arrows from the line III—III of FIG. 1, with the web omitted; and FIG. 4 is a sectional view as seen in the direction of arrows from the line IV—IV of FIG. 3.

DESCRIPTION OF THE PREFERRED EMBODIMENTS

The apparatus which is shown in FIGS. 1 and 2 can be said to constitute a table having a frame 1 with floor-contacting wheels 2 so that the apparatus can be readily transported between different locales of use as well as to and from storage. The length of the apparatus (in a direction from the left to the right, as viewed in FIG. 1) is preferably at least twice the width thereof (as considered in a direction from the left to the right in FIG. 2). The frame 1 comprises two substantially Z-shaped end portions 1a, 1b each of which consists of welded-together profiled metallic components. the end portions 1a, 1b are connected to each other by traverses extending lengthwise of the apparatus, and the aforementioned wheels 2 are mounted on the lowermost components of the end portions 1a, 1b. The just mentioned traverses are located at the rear side of the frame 1 (i.e., at the left-hand side, as viewed in FIG. 2) so that the front side of the frame remains unobstructed, especially in the region close to the floor F, so that an attendant can be seated in front of the apparatus (at the right-hand side of the frame, as viewed in FIG. 2) and has room for insertion of his or her legs into the space L between the end portions 1a, 1b. The frame 1 may include additional components which are necessary to impart necessary rigidity so that the apparatus can support a relatively heavy and bulky supply reel 4, e.g., a reel which stores up to and in excess of 300 meters of exposed and developed photographic paper 7. Such additional components include a rear wall 1d which is inclined rearwardly and downwardly and supports two rotary mounting means 3 (here shown as elongated spindles preferably having conical outer end portions 3a to facilitate rapid mounting of a reel thereon) one of which can carry a supply reel 4 and the other of which can carry a takeup reel 5. As shown in FIGS. 1 and 2, the mounting means or spindle 3 for the supply reel 4 is located close to the floor F so that the reel 4 must be lifted through a negligible or relatively small distance in order to mount its core on the respective spindle. This is particularly important when the web 7 of photographic paper is rather wide and very long because the reel 4 is then extremely heavy and its lifting to a level well above the floor would necessitate the exertion of a substantial effort. The rear wall 1d is preferably a plate which is sufficiently stiff (or is suitably reinforced) to readily support the two spindles 3, and reels 4, 5 on such spindles, as well as at least some elements of the drive means for rotating one of the spindles when the other spindle is braked or vice versa.

The spindles 3 preferably carry disk-shaped turntables 3A (one shown in FIG. 1) having projections which enter complementary sockets on the adjacent flanges of the reels so that the reels are compelled to share all angular movements of the respective spindles. For example, each turntable may comprise a single eccentric pin which enters a complementary hole in the adjacent flange of the respective reel. However, it is equally possible to provide the projection or projections on the flanges of the reels 4, 5 and to provide the turntables 3A with complementary sockets for such projections.

The frame further carries a hollow box or receptacle 6 which is disposed in the space between the spindles 3 and is located at a level above the rear wall 1d. This box has a rearwardly and upwardly inclined transparent pane 6a which is disposed between two arm supports 1c of the frame and is normal or substantially normal to the plane of the rear wall 1d, i.e., the axes of the spindles 3 are parallel or nearly parallel to the plane of the pane 6a. The rear wall or panel 6b of the box 6 is vertical or nearly vertical (see FIGS. 2 and 3). The rear side or surface of that portion of the web 7 which extends between the reels 4 and 5 lies flat against the front side or surface of the pane 6a so that a person sitting in front of the frame 1 can observe the prints which travel in a direction from the left to the right, as viewed in FIG. 1. In order to lengthen the just discussed portion of the web 7, the frame 1 preferably supports a guide roller 8 which is located directly above the supply reel 4 and enables an attendant to start viewing selected or successive prints at the front side of the web even before such print or prints reach the left-hand edge of the pane 6a, as viewed in FIG. 1. As shown in FIG. 1, the supply reel 4 and the guide roller 8 are preferably adjacent to the left-hand end portion 1b of the frame 1 so that the attendant can view selected or successive prints for relatively long intervals of time, even if the web 7 is transported at a relatively high speed and even if the apparatus is relatively short. The apex of the guide roller 8 is preferably located in the plane of the exposed outer side or surface of the pane 6a so that the web 7 need not be deflected or twisted during travel from the guide roller 8 toward and in front of the box 6. The level of the spindle 3 for the takeup reel 5 is preferably selected in such a way that, when the entire web 7 is transferred onto the reel 5, the apex of the outermost convolution of the collected web is located in the plane of the apex of the guide roller 8, i.e., flush with the outer side of the pane 6a.

The frame 1 preferably further comprises a two-piece front wall 1e, 1f which flanks the leg room or space L. The portions 1e, 1f of the front wall define with the adjacent portions of the rear wall 1d two compartments which accommodate components of drive means and braking means for the spindles 3. FIG. 1 merely shows, at 50, the locus of those components of the drive means and braking means which are installed in the right-hand compartment behind the portion 1f of the front wall. Certain components of the drive and braking means can also be installed in the interior of the box 6 at one or both sides of the pane 6a. Such components may include one or more electric motors for the spindles 3, transmission means, control elements for regulating the speed of the spindles, and others. The control elements preferably include detectors which monitor the diameters of web portions which are convoluted on the cores of the reels 4 and 5 to thus insure that the speed of the reel 5 is gradually reduced while the reel 5 collects the web 7 and that the speed of the reel 4 is gradually increased as the diameter of the roll of convoluted web thereon decreases, and vice versa. The purpose of control elements is to insure that the speed of the web portion between the reels 4 and 5 remains at least substantially constant. The control elements preferably further include a speed selecting device which can be manipulated by the attendant so as to select the exact speed at which the web travels in front of the pane 6a.

If the apparatus comprises discrete motors for the reels 4 and 5, the torque which the motors transmit to the respective spindles 3 is preferably selected in such a way that the tension of the web between the reels 4 and 5 remains constant. Therefore, and assuming that the web 7 travels from the reel 4 toward the reel 5, the motor for the spindle 3 which drives the reel 4 must act as a brake while the other motor causes the reel 5 to rotate in a direction to collect the web. The aforementioned detector means can regulate the braking action so that the tension of the web 7 is constant. The motors are of the reversible type so that the web 7 can be rewound onto the reel 4 before the latter is removed from the apparatus. The reel 5 need not be detached from the respective spindle 3, and this reel is preferably provided with a single flange (adjacent to the turntable of the respective spindle 3) so that the leader of a fresh web can be readily attached to or detached from the exposed core of the reel 5. The rewinding of web onto the supply reel 4 preferably takes place while the reels 4, 5 are driven at a very high speed, i.e., at a speed greatly exceeding the speed of transport of the web 7 from the reel 4 toward the reel 5. The manner in which the motors of the drive means for the reels 4, 5 are reversible is well known from the art and is not shown in the drawing.

The box 6 further contains mirrors 9 and 10 which serve to image the rear side or surface of the web portion in front of the pane 6a in such a way that the image of the rear surface can be observed by an attendant sitting in front of the pane 6a. The mirror 9 is substantially horizontal and the mirror 10 is substantially vertical. The mirror 9 is mounted on a bottom panel or carrier 11 of the box 6 and the mirror 10 is located in front of the rear panel 6b. The means for fixedly securing the mirror 9 to the carrier 11 comprises U-shaped brackets 13A. The mirror 10 is secured to a pivotable plate-like holder 12 by means of U-shaped brackets 13 and the lower edge portion of the holder 12 has two or more projections or lugs 12a extending into cutouts 11a of the carrier 11 with sufficient play to enable the holder 12 to pivot about its lower edge portion.

The holder 12 is welded to an elongated horizontal rod 14 which is located approximately or exactly midway between the upper and lower edge portions of the upright mirror 10 and one end portion 14a of which extends from the box 6 (see FIG. 4). The end portion 14a has external threads and extends through an arcuate slot 15a in the respective lateral panel 15 of the box 6. The center of curvature of the slot 15a is located on the pivot axis (lower edge portion) of the holder 12. The end portion 14a meshes with two lock nuts 16, 17 which are located at the inner side of the slot 15a, and with clamping nut 19 at the outer side of the panel 15. A washer 18 is interposed between the nut 17 and the inner side of the panel 15. When the nut 19 is loosened, the operator can pivot the holder 12 and the mirror 10 with respect to the mirror 9. Once the operator has selected an appropriate angular position for the mirror 10, the nut 19 is rotated in a direction to bear against the panel 15 and to thereby lock the mirror 10 in the selected angular position. The mirrors 9 and 10 are preferably of the type known as surface mirrors i.e., each thereof exhibits a very high degree of reflectivity.

The operation:

A fresh supply reel 4 (having a cylindrical core and two flanges flanking the annular space for reception of convoluted photographic paper) is placed onto the respective spindle 3 so that the socket or sockets of its inner flange 4A receive the projection or projections of the respective turntable 3A. The web 7 of photographic paper on the supply reel 4 has been caused to pass through a copying machine and thereupon through a developing machine so that its outer surface carries a succession of prints representing the images of successive film frames and its rear side or surface carries indicia which were applied thereto during printing and represent data pertaining to the nature of exposures. The leader of the web 7 on the supply reel 4 is thereupon caused to pass over the guide roller 8 and the front side or surface of the pane 6a and is attached to the core of the takeup reel 5 which, as mentioned above, preferably comprises a single flange so that the leader of the web can be readily attached to its core. For example, the leader can be coiled around the core of the takeup reel 5 so that it forms one or more complete convolutions to thus insure that the reel 5 can draw the web off the reel 4 when the spindle 3 for the reel 5 begins to rotate in a clockwise direction, as viewed in FIG. 1. As soon as a portion of the web 7 extends in front of the pane 6a, a substantial number of prints at the front side or surface of such web portion can be viewed by the attendant who inspects the quality of prints and decides whether or not one or more prints much be discarded and the respective film frame or frames exposed for a second time with different exposure parameters. The attendant also decides whether or not one or more prints are so poor that the corresponding film frame or frames cannot be used for the making of acceptable prints. The information which is recorded by the attendant is used later on during sorting of prints, i.e., subsequent to severing of the web 7 to yield discrete prints.

The attendant can sit in front of the frame 1 with his or her legs in the space L and with one or both arms resting on the respective arm rest(s) 1c. These arm rests extend forwardly beyond the lower edge portion of the pane 6a. The aforementioned speed selecting device is within reach so that the attendant can select the speed at which the web 7 travels in front of the pane 6a. Once the speed has been selected, it remains constant due to the provision of aforementioned detector means which monitor the diameters of rolls on the cores of the reels 4 and 5 and regulate the speed of the corresponding motors.

The area around the apparatus is illuminated so that a certain amount of light penetrates through the pane 6a whose height preferably greatly exceeds the width of the web 7 (see FIG. 1). Such light is reflected by the surface of the mirror 9 onto the rear side of the web 7 in front of the pane 6a and thence onto the surface of the mirror 10. The image which is reflected by the mirror 10 can be observed by the attendant sitting in front of the apparatus. In order to select a convenient level for the reflected image of the rear side of the web 7, the attendant loosens the clamping nut 19 and thereupon adjusts the inclination of the holder 12 so that the reflected image is observable at a desired distance above the web 7. As mentioned above, the information at the rear side of the web may include data which are applied during passage of the web through the copying machine. In addition, such information may include marks representing the end of a series of prints belonging to a particular customer and/or others. The mirrors 9 and 10 furnish an upright image of the rear side of the web 7, and the illumination of the area around the apparatus suffices to allow for convenient observation of such image even if the box 6 does not contain any light source.

When the takeup reel 5 collects the entire web 7, the motors for the spindles 3 are arrested and the direction of their rotation reversed. If the trailing end of the web 7 has been detached from the core of the supply reel 4, it must be reattached to the reel 4 before the motors are started in a direction to withdraw the web from the reel 5. The rear and/or front side of the web may carry a suitable indication which is seen by the attendant and is intended to inform him that the motors should be arrested in order to prevent separation of the trailing end of the web from the core of the supply reel 4. As a rule, the winding of web onto the core of the supply reel 4 will take place at a very high speed because the web need not be inspected during such rewinding. The reel 4 is thereupon lifted off the respective spindle 3 and is replaced with a fresh reel. The apparatus is then ready to transport the web from the freshly attached supply reel toward the takeup reel 5.

An important advantage of the improved apparatus is that is can accept large or smaller supply reels and that such reels need not be lifted well above the floor in order to be properly attached to the respective mounting means. This is particularly important when the web 7 is wide and the supply reel carries a roll having a very large diameter i.e., when the supply reel stores up to and in excess of 300 meters of photographic paper or the like. All an operator has to do is to lift a supply reel sufficiently to insert the respective mounting means into the axial bore of the core of the supply reel.

Another important advantage of the improved apparatus is that a print at the front side of the web can be observed during a relatively long interval of time, i.e., practically immediately after the print leaves the supply reel and all the way to the locus where the corresponding portion of the web reaches the takeup reel. Also the indicia at the rear side of the web can be observed as long as they are located behind the pane 6a (provided that the length of mirrors 9, 10 equals for approximates the length of the box 6). Such observation of the rear side of the web does not necessitate the provision of discrete illuminating means in the interior of the box 6 (even though the use of such illuminating means is not excluded) because the web overlies a relatively small portion of the pane 6a so that the latter admits enough light for adequate imaging of the rear side of the web.

The apparatus of FIGS. 1 to 4 is susceptible of many further modifications without departing from the spirit of the invention. For example, the means for pivoting or tilting the mirror 10 may be modified in a number of ways (e.g., by rotatably mounting the rod 14 in the lateral panel or panels of the box 6 so that the pivot axis of the holder 12 coincides with the axis of the rod 14). The length of the apparatus can be reduced by mounting the spindle 3 for the takeup reel 5 immediately below the box 6; in such apparatus, the web must be guided by suitable rollers to avoid damage to its rear side during travel from the righthand edge portion of the pane 6a (as viewed in FIG. 1) toward the takeup reel. The winding of the leader of a fresh web onto the core of the takeup reel 5 can be effected by the attendant while sitting in front of the table, especially if the reel 5 is mounted in a manner as shown in FIG. 1.

The drive means for rotating and braking the spindles 3 is also susceptible of many modifications. For example, such drive means may be similar or practically identical with the drive means disclosed in commonly owned German Utility Model No. 1,954,051 to which reference may be had if necessary.

The means 12–19 for changing the inclination of the mirror 10 with respect to the mirror 9 can be provided in addition to or as a substitute for suitable means (not shown) for changing the inclination of the mirror 9 with respect to the mirror 10.

The two-piece front wall 1e, 1f can be replaced with a one-piece front wall (indicated in FIG. 2, as at 1g) which is parallel with and closely adjacent to the rear wall 1d. The walls 1d, 1g define an elongated compartment which extends the full length of the frame 1 and confines and supports at least some components of the drive for the mounting means 3.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. Apparatus for viewing of front and rear surfaces of a web of photographic paper or the like while the web is being withdrawn from a supply reel and is collected by a takeup reel, comprising a frame having front and rear sides; a light-transmitting pane mounted on said frame and being inclined with respect to a horizontal plane so that one surface thereof is exposed and slopes upwardly and rearwardly with respect to said front side, said frame having a portion located at the rear side thereof; spaced-apart first and second rotary mounting means on said portion of said frame for respectively supporting a supply reel and a takeup reel so that the axes of the reels are substantially parallel to said one surface of said pane and the rear surface of the web portion between the reels on said mounting means lies against said one surface of said pane whereby the front surface of such web portion is observable from the front side of said frame; and mirrors mounted on said frame behind said pane for imaging the rear surface of said web portion so that the image of said rear surface of said web portion is observable through said pane from the front side of said frame.

2. Apparatus as defined in claim 1, wherein said frame has floor-contacting portions and at least that part of said portion of said frame which carries said first mounting means is located at a level below said pane so that a supply reel on said first mounting means is close to the floor.

3. Apparatus as defined in claim 1, further comprising drive means for rotating one of said mounting means at a time in a direction to cause the reel on said one mounting means to collect the web.

4. Apparatus as defined in claim 1, further comprising a hollow box mounted on said frame intermediate said mounting means, said pane forming part of said box and said mirrors being installed in said box.

5. Apparatus as defined in claim 4, wherein said mirrors include first and second mirrors having first and second reflecting surfaces which are substantially normal to each other, one of said mirrors being positioned to reflect light against the rear side of said web portion and the other mirror being positioned to reflect the image of said rear surface through said pane adjacent to that part of said pane which is overlapped by said web portion.

6. Apparatus as defined in claim 1, further comprising a hollow receptacle mounted on said frame and including said pane, said receptacle further having a substantially vertical rear panel located above said portion of said frame.

7. Apparatus as defined in claim 6, wherein said portion of said frame is a wall which is substantially normal to said pane and further comprising drive means for said mounting means, at least a portion of said drive means being installed in said receptacle.

8. Apparatus as defined in claim 1, wherein said portion of said frame constitutes the rear wall thereof and is substantially normal to said pane, said frame further including a front wall which is spaced apart from said rear wall and substantially Z-shaped frame portions between said walls.

9. Apparatus as defined in claim 1, further comprising rotary guide means mounted in said frame laterally of said pane so that a web passing from the supply reel on said first mounting means toward and in front of said pane is trained over said guide means.

10. Apparatus as defined in claim 9, wherein said guide means is mounted in said frame at a level above said first mounting means and the uppermost portion thereof is substantially flush with said one surface of said pane.

11. Apparatus as defined in claim 1, wherein said mirrors include a substantially horizontal mirror below said pane and a second mirror which is substantially normal to said first mirror, and further comprising means for changing the inclination of at least one of said mirrors with respect to the other mirror.

12. Apparatus as defined in claim 11, wherein said one mirror is said second mirror.

13. Apparatus as defined in claim 12, wherein said second mirror has an elongated lower edge portion and is pivotable along said edge portion thereof, said means for changing the inclination of said second mirror including means for pivoting the latter about said edge portion thereof.

14. Apparatus as defined in claim 13, further comprising a hollow receptacle mounted on said frame and including said pane, said mirrors being disposed in the interior of said receptacle and said means for pivoting said second mirror comprising a device extending from said receptacle and being actuatable by hand to change the inclination of said second mirror, said receptacle further including a panel having an arcuate slot for said device, the center of curvature of said slot being located on the pivot axis for said second mirror.

15. Apparatus as defined in claim 14, wherein said means for pivoting said second mirror further includes means for clamping said device to said receptacle in any one of a plurality of different positions of said second mirror with respect to said first mirror.

16. Apparatus as defined in claim 11, wherein said mirrors are surface mirrors.

17. Apparatus as defined in claim 1, wherein said front side of said frame provides leg room for an attendant sitting in front of said frame.

* * * * *